US011118892B2

(12) United States Patent
Lussier Desbiens et al.

(10) Patent No.: US 11,118,892 B2
(45) Date of Patent: Sep. 14, 2021

(54) METHOD AND APPARATUS FOR MEASURING RIGIDITY DISTRIBUTION

(71) Applicant: SOCPRA SCIENCES ET GENIE S.E.C., Sherbrooke (CA)

(72) Inventors: Alexis Lussier Desbiens, Sherbrooke (CA); Camille Brousseau, Sherbrooke (CA); Jonas Truong, Gatineau (CA)

(73) Assignee: SOCPRA SCIENCES ET GENIE S.E.C., Sherbrooke (CA)

( * ) Notice: Subject to any disclaimer, the term of this patent is extended or adjusted under 35 U.S.C. 154(b) by 622 days.

(21) Appl. No.: 16/061,537

(22) PCT Filed: Dec. 16, 2016

(86) PCT No.: PCT/CA2016/051498
§ 371 (c)(1),
(2) Date: Jun. 12, 2018

(87) PCT Pub. No.: WO2017/100940
PCT Pub. Date: Jun. 22, 2017

(65) Prior Publication Data
US 2020/0263970 A1 Aug. 20, 2020

Related U.S. Application Data

(60) Provisional application No. 62/268,533, filed on Dec. 17, 2015.

(51) Int. Cl.
*G01B 5/30* (2006.01)
*G01N 3/20* (2006.01)
(Continued)

(52) U.S. Cl.
CPC .......... *G01B 5/30* (2013.01); *G01N 3/20* (2013.01); *G01N 3/22* (2013.01); *G01B 5/0002* (2013.01);
(Continued)

(58) Field of Classification Search
CPC ... G01B 3/20; G01B 3/22; G01B 5/00; G01B 5/30; G01B 5/0023; G01B 5/0002;
(Continued)

(56) References Cited

U.S. PATENT DOCUMENTS 3,196,672 A * 7/1965 Keller ............... G01N 3/20
73/812
4,290,499 A * 9/1981 Luomaranta ........... A63C 11/00
177/210 R
(Continued)

*Primary Examiner* — Jonathan M Dunlap
(74) *Attorney, Agent, or Firm* — Norton Rose Fulbright Canada LLP

(57) ABSTRACT

An apparatus for measuring a deformation distribution of an object having a longitudinal dimension comprises a structure for supporting the object. A sensor unit comprises a base, a contact member having a body connected to the base by a rotational joint such rotational degrees of freedom are provided between the base and the contact member, an end of the body configured to contact and move along the object, and at least one sensor for determining an orientation of the body relative to the base. A displacement module enables relative movement between the sensor unit and the structure for the sensor unit to relatively move along the object in the longitudinal dimension. A method and system for measuring a rigidity distribution of an object having a longitudinal dimension are also provided.

20 Claims, 8 Drawing Sheets

(51) Int. Cl.
*G01N 3/22* (2006.01)
*G01B 5/00* (2006.01)
*G01N 3/08* (2006.01)

(52) U.S. Cl.
CPC .......... *G01B 5/0007* (2013.01); *G01B 5/0023* (2013.01); *G01N 3/08* (2013.01); *G01N 2203/0264* (2013.01)

(58) Field of Classification Search
CPC .. G01B 5/0004; G01B 5/0007; G01B 5/0009; G01N 3/22; G01N 3/20; G01N 3/00; G01N 3/08; G01N 2203/0264; G01N 2203/0003; G01N 2203/0019; G01N 2203/0021; G01N 2203/0028; G01N 2203/0026; G01N 2203/0016; G01N 2203/0032; G01N 2203/0033; G01N 2203/0037; G01N 2203/0042; G01N 2203/0044; G01N 2203/0048; G01N 2203/04
See application file for complete search history.

(56) References Cited

U.S. PATENT DOCUMENTS

| | | | | |
|---|---|---|---|---|
| 4,474,067 | A * | 10/1984 | Cherry, III | G01N 3/20 73/794 |
| 5,218,842 | A * | 6/1993 | Tower, Jr. | G01N 3/20 73/794 |
| 5,503,024 | A * | 4/1996 | Bechtel | G01N 3/20 73/849 |
| 5,731,524 | A | 3/1998 | Matsumoto et al. | |
| 5,804,738 | A * | 9/1998 | Bach | G01N 3/20 73/849 |
| 9,481,082 | B1 * | 11/2016 | Hafenrichter | B64F 5/60 |
| 10,677,666 | B2 * | 6/2020 | Hollenbacher | G09B 19/0038 |
| 2001/0027137 | A1 | 10/2001 | Weiss | |
| 2014/0182479 | A1 * | 7/2014 | Hafenrichter | B64F 5/60 105/30 |
| 2014/0305217 | A1 * | 10/2014 | Tapia | G01N 27/9013 73/618 |
| 2016/0025615 | A1 * | 1/2016 | Fishel | G01N 19/00 702/33 |

\* cited by examiner

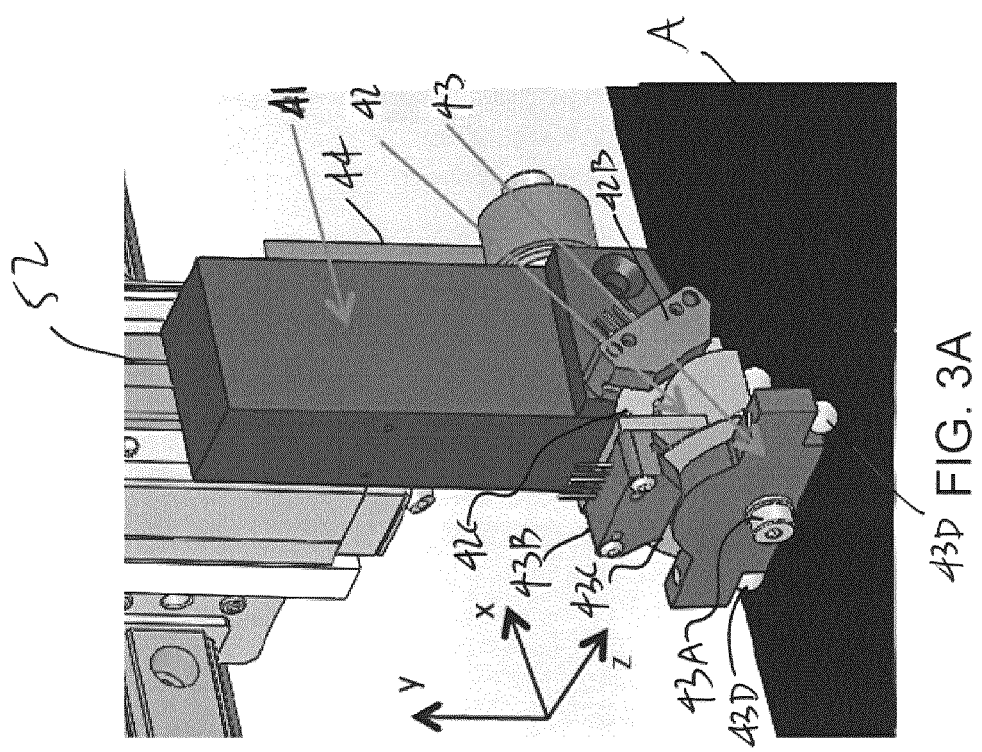

METHOD AND APPARATUS FOR MEASURING RIGIDITY DISTRIBUTION

CROSS-REFERENCE TO RELATED APPLICATION

The present application claims the priority of U.S. Patent Application Ser. No. 62/268,533, filed on Dec. 17, 2015, the content of which is incorporated herein by reference.

FIELD OF THE APPLICATION

The present application relates to a method and to an apparatus for measuring the rigidity distribution of elongated objects, such as beams, and elongated sporting goods such as skis, hockey sticks, golf clubs, snowboards, among numerous contemplated uses.

BACKGROUND OF THE ART

Rigidity distribution in flexion and torsion are mechanical properties that describe the manner in which beams deform. These properties are primary parameters in some engineering aspects. For example, the flexion and torsion rigidity of a ski determine necessary forces in order for the ski to bend and adopt a carving radius. Likewise, the rigidity in flexion of a hockey stick will determine the energy that can be stored by the stick to subsequently be transferred to the puck. Moreover, the distribution of the rigidity on such items may greatly affect their performance. For example, a hockey stick may be favoured over another if it is more rigid centrally than at its ends. Hence, the capacity to measure rapidly and precisely the rigidity distribution of elongated items and beams can provide useful data on the behavior of the elongated item.

The rigidity of a beam section is defined by the ratio of the applied flexion or torsion moment to the instantaneous curvature along the beam, i.e., the curvature resulting from the moments. Hence, to measure the rigidity of a beam section, it is necessary to measure the moment as well as the curvature. This is done by taking discrete points of measurement along the beam. The curvature is determined using a derivative of the deformation at the discrete points. Hence, existing technology often requires set-up steps in which measurements are taken at various locations along the beam, at discrete times, which is time consuming and prone to human errors.

SUMMARY OF THE APPLICATION

It is therefore an aim of the present disclosure to provide an apparatus for measuring rigidity distribution that addresses issues related to the prior art.

It is a further aim of the present disclosure to provide a method for measuring a rigidity distribution that addresses issues related to the prior art.

Therefore, in accordance with a first embodiment of the present disclosure, there is provided an apparatus for measuring a deformation distribution of an object having a longitudinal dimension, comprising: a structure for supporting the object; a sensor unit comprising a base, at least one contact member having a body connected to the base by a rotational joint such that at least one rotational degree of freedom is provided between the base and the contact member, at least an end of the body configured to contact and move along the object, and at least one sensor for determining an orientation of the body relative to the base; and a displacement module enabling relative movement between the sensor unit and the structure for the sensor unit to relatively move along the object in the longitudinal dimension.

Further in accordance with the first embodiment, the at least one contact member includes a flexion contact member rotatably connected relative to the base such that an axis of rotation of the flexion contact member is generally perpendicular to a vector of the longitudinal dimension.

Still further in accordance with the first embodiment, the at least one contact member includes a torsion contact member rotatably connected relative to the base such that an axis of rotation of the torsion contact member lies in a same plane as a vector of the longitudinal dimension.

Still further in accordance with the first embodiment, the flexion contact member is rotatably connected to the base, and the torsion contact member is rotatably connected to the flexion contact member.

Still further in accordance with the first embodiment, the torsion contact member has two of the ends configured to contact and move along the object, the two ends being on opposed sides of the axis of rotation of the flexion contact member.

Still further in accordance with the first embodiment, the at least one end is a follower ball portion.

Still further in accordance with the first embodiment, the at least one sensor is an optical encoder for each one of the rotational degree of freedom.

Still further in accordance with the first embodiment, the structure has a clamp to releasably support the object.

Still further in accordance with the first embodiment, the displacement module has a longitudinal linear actuator actuatable to displace the sensor unit along the longitudinal dimension.

Still further in accordance with the first embodiment, the displacement module has a vertical linear actuator actuatable to displace the sensor unit vertically.

Still further in accordance with the first embodiment, the sensor unit includes a carriage connecting the base to the displacement module, the base being biased by a constant-force spring.

Still further in accordance with the first embodiment, further a load-applying module applies a load on the object.

Still further in accordance with the first embodiment, the load-applying module has a clamp configured for being connected to the object, the clamp adapted to receive forces at opposed end to exert flexion and/or torsion on the object.

Still further in accordance with the first embodiment, the load-applying module includes force transducers to measure the forces applied to the clamp.

Still further in accordance with the first embodiment, a processor receives readings from at least the sensor unit, and for measuring a deformation distribution using at least the orientation of the body relative to the object as a function of a position of the body in the longitudinal dimension.

In accordance with a second embodiment of the present disclosure, there is provided a method for measuring a rigidity distribution of an object having a longitudinal dimension, comprising: enabling relative movement in the longitudinal dimension between a sensor unit and the object, the sensor unit having at least one contact member displaceable in at least one rotational degree of freedom relative to the base as a result of contact with the object in the relative movement; obtaining, using one or more processors of a computer system, an orientation profile of the at least one contact member during the relative movement between the sensor unit and the object in the longitudinal dimension, from readings of the sensor unit; obtaining, using the one or more processors of the computer system, position values for the orientation profile from the relative movement; and calculating and outputting, using the one or more processors of the computer system, a rigidity distribution along the longitudinal dimension of the object, using a moment of force profile applied to the object with the corresponding orientation profile and position values.

Further in accordance with the second embodiment, enabling relative movement comprises controlling, using the one or more processors of the computer system, movement of the sensor unit along the object in the longitudinal dimension.

Still further in accordance with the second embodiment, controlling movement of the sensor unit along the object in the longitudinal dimension further comprises controlling movement of the sensor unit in a vertical direction.

Still further in accordance with the second embodiment, obtaining position values for the orientation profile from the relative movement includes obtaining vertical position values.

Still further in accordance with the second embodiment, enabling relative movement in the longitudinal dimension between the sensor unit and the object results in movements of the at least one contact member about an axis generally perpendicular to a vector of the longitudinal dimension, and wherein calculating and outputting the rigidity distribution along the longitudinal dimension comprises calculating and outputting a flexion of the object.

Still further in accordance with the second embodiment, enabling relative movement in the longitudinal dimension between the sensor unit and the object results in movements of the at least one contact member about an axis lying in a same plane as a vector of the longitudinal dimension, and wherein calculating and outputting the rigidity distribution along the longitudinal dimension comprises calculating and outputting a torsion of the object.

Still further in accordance with the second embodiment, a value of force applied to the object is obtained, and the moment of force profile is calculated from the value of force applied to the object.

In accordance with a third embodiment of the present disclosure, there is provided a rigidity distribution measurement processor system for measuring a rigidity distribution of an object having a longitudinal dimension a sensor unit relatively movable in a longitudinal dimension along the object, the sensor unit having at least one contact member displaceable in at least one rotational degree of freedom as a result of contact with the object during relative movement, comprising: an orientation profile module for generating an orientation profile of the at least one contact member during the relative movement between the sensor unit and the object in the longitudinal dimension, from readings of the sensor unit; a position value module for generating position values for the orientation profile from the relative movement; and a rigidity distribution calculation module for calculating and outputting a rigidity distribution along the longitudinal dimension of the object, using a moment of force profile applied to the object with the corresponding orientation profile and position values.

Further in accordance with the third embodiment, a control module is provided for controlling at least one actuator displacing the sensor unit along the object in the longitudinal dimension.

Still further in accordance with the third embodiment, the control module controls movement of the sensor unit in a vertical direction.

Still further in accordance with the third embodiment, the position value module generates the position values by including vertical position values.

Still further in accordance with the third embodiment, the orientation profile module generates the orientation profile to include movements of the at least one contact member about an axis generally perpendicular to a vector of the longitudinal dimension, and wherein the rigidity distribution calculation module calculates and outputs the flexion of the object.

Still further in accordance with the third embodiment, the orientation profile module generates the orientation profile to include movements of the at least one contact member about an axis lying in a same plane as a vector of the longitudinal dimension, and wherein the rigidity distribution calculation module calculates and outputs the torsion of the object.

Still further in accordance with the third embodiment, the rigidity distribution calculation module obtains a value of force applied to the object, and calculates the moment of force profile from the value of force applied to the object.

BRIEF DESCRIPTION OF DRAWINGS

For a better understanding of the present invention, as well as other aspects and further features thereof, reference is made to the following description which is to be used in conjunction with the accompanying drawings, where:

FIG. 3A is a first top perspective view of a sensor unit as mounted to a displacement module of the apparatus of FIG. 1;

DESCRIPTION OF PREFERRED EMBODIMENTS

Figure 1:
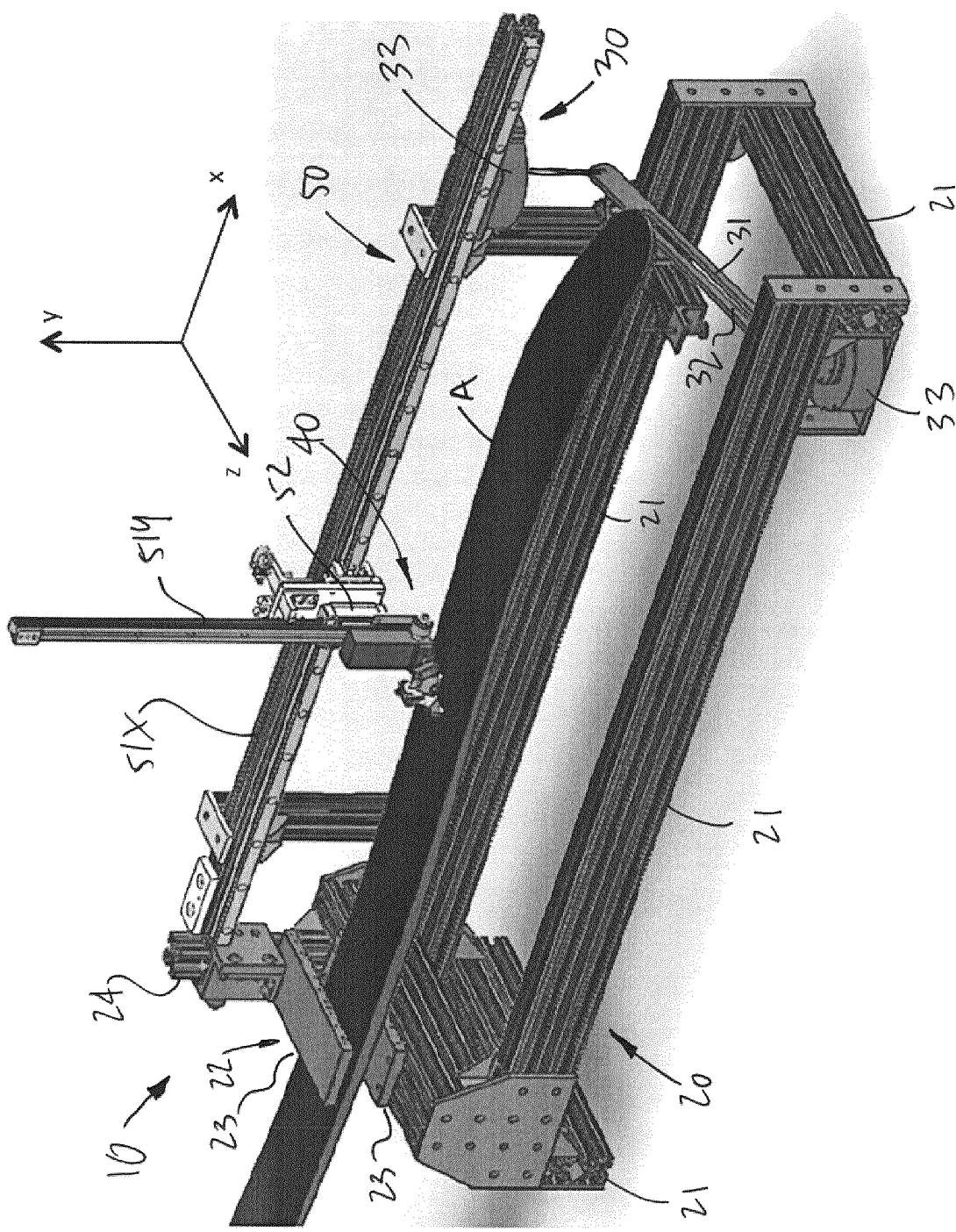
FIG. 1 is a perspective view of an apparatus for measuring rigidity in accordance with the present disclosure, as shown used with a ski.

Referring to the drawings and more particularly to FIG. 1, there is illustrated at 10 an apparatus for measuring a rigidity distribution of elongated objects. The apparatus 10 is used to assist in measuring the rigidity distribution of an elongated element by measuring angular displacements leading to angular deformations, as described in full detail hereinafter. While the expression rigidity is used, the apparatus 10 may measure the stiffness distribution, due to the relation between rigidity and stiffness. A plurality of objects can be tested in the apparatus 10, but for exemplary purposes the apparatus 10 is shown as used to measure the angular deformation profile of a ski A, by which the rigidity profile may then be calculated. As non-exclusive examples, the apparatus 10 may test beams used in the construction industry (e.g., of all types of materials), elongated sporting goods such as skis, hockey sticks, golf clubs, snowboards, among numerous contemplated uses. The apparatus 10 may be used in quality control in the manufacturing of such elongated objects, whether it be in composites, wood, polymers, etc, molded, cast, extruded, etc. For simplicity, reference is made hereinafter to the use of the apparatus 10 with the ski A, although clearly the apparatus 10 could be used with other elongated objects.

The apparatus 10 may have a structure 20, a load-applying module 30, a sensor unit 40 and a displacement module 50. Moreover, the apparatus 10 may be used with a rigidity distribution measurement processor system 60 (FIG. 6) to be part of a system to measure the rigidity of an object.

The structure 20 is provided to support various other components of the apparatus 10, and the ski A. The structure 20 may be the interface of the apparatus 10 with the ground or another structure (e.g., table, bench, etc).

The load-applying module 30 may be provided to apply a load on the ski A.

The sensor unit 40, also known as probe, measures the angular deformation profile of the ski A in the apparatus 10 resulting from flexion and/or torsion.

The displacement module 50 interfaces the sensor unit 40 to the structure 20, and is controlled to displace the sensor unit 40 along the ski A. While the illustrated embodiment shows a displacement of the sensor unit 40 along the ski A, it is contemplated to cause relative displacement between the ski A and the sensor unit 40 by displacing the ski A while the sensor unit 40 is fixed.

Referring to FIG. 1, the structure 20 is shown relative to a three-axis coordinate system. The orientation of the three-axis coordinate system may be arbitrary, but for ease of reference, the X-axis is generally aligned with a longitudinal dimension of the elongated object, the Y-axis is the vertical axis, for example aligned with gravity, and the Z-axis is perpendicular or transverse to the longitudinal dimension of the ski A.

The structure 20 may have structural beams 21 as illustrated in FIG. 1. However, this is one of many possible arrangements, as other components could be used to support the ski A, the load-applying module 30, the sensor unit 40 and the displacement module 50, including planks, a bench, a table, etc. Moreover, the structure 20 may have legs to be self-standing, may have anchoring to be secured to a support, etc. In an embodiment, the apparatus 10 is portable, and the structure 20 is devised to facilitate transportation (e.g., foldable legs, casters, etc).

The structure 20 has one or more clamps 22 so as to support a portion of the ski A. For example, the structure 20 could have a pair of clamps 22 to support the ski A at its opposed ends. It may also be desired to support the ski A or other elongated object with clamp 22 being centrally located along the ski, such that the opposed ends of the ski are cantilevered as in FIG. 1. The number of clamps 22 may depend on the nature of elongated object tested, and/or on the measuring protocol, among other factors.

The clamp 22 may have a pair of jaws 23 to clamp down on the ski A. The jaws 23 may have smooth flat contact surfaces facing each other, so as to apply uniform pressure on the ski A. The contact surfaces of the jaws 23 depend on the type of elongated object tested. For example, if the elongated object has a circular section, e.g., a golf club, the contact surfaces of the jaws 23 may be devised as semi-cylindrical or frusto-conical receptacles to accommodate the elongated object A adequately. The upper jaw 23 is supported by a translational joint 24, such that it may translate up and down along axis Y, while the lower jaw 23 is fixed to a remainder of the structure 20. As an alternative to the translational joint 24, a pivot joint could be used, among other possibilities, to allow the clamping of the jaws 23.

Figure 2:
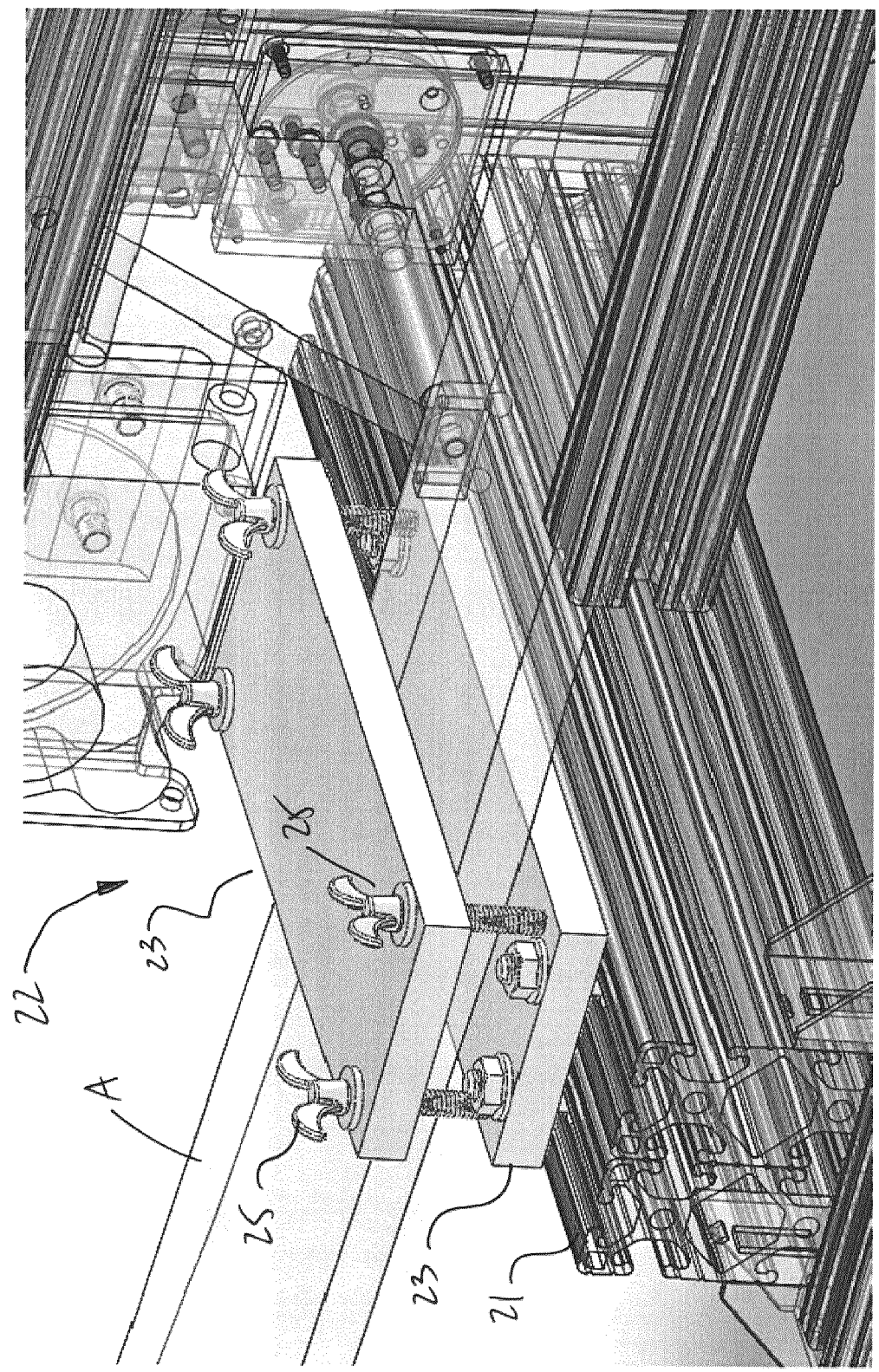
FIG. 2 is a perspective view of a clamp of the apparatus of FIG. 1.
Figure 3B:
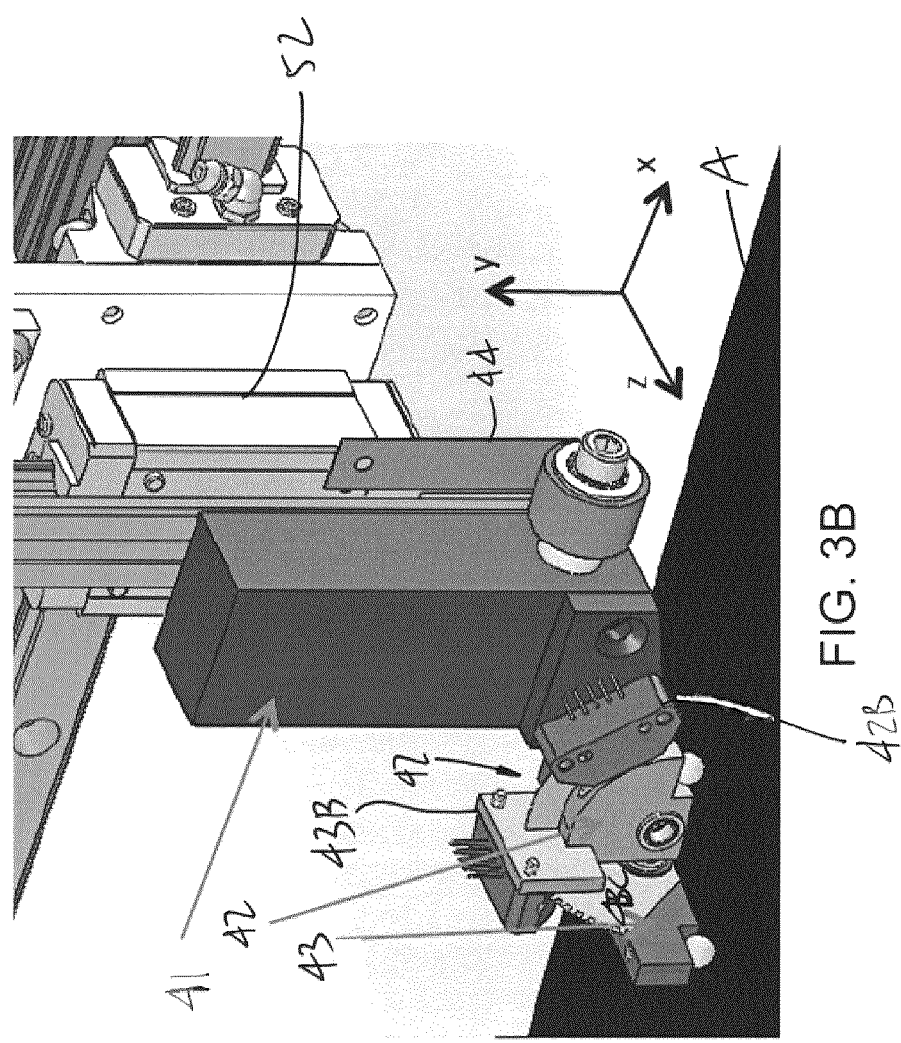
FIG. 3B is a second top perspective view of the sensor unit of FIG. 3A.
Figure 3C:
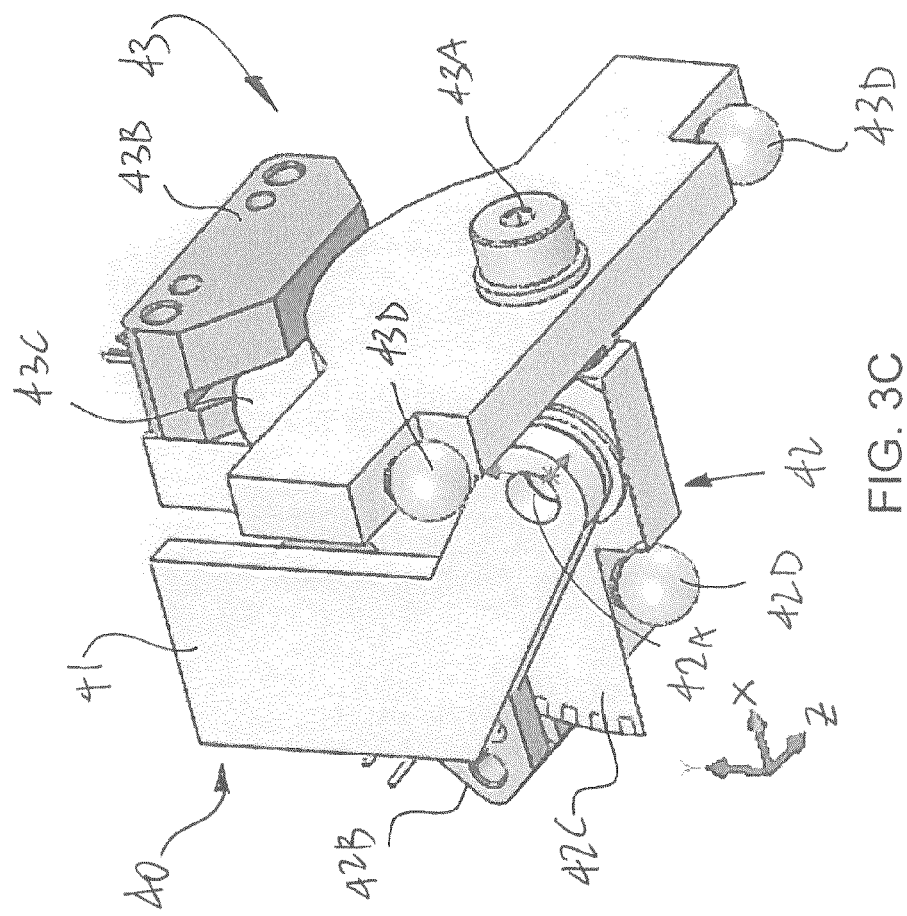
FIG. 3C is a bottom perspective view of the sensor unit of FIGS. 3A and 3B.
Figure 4:
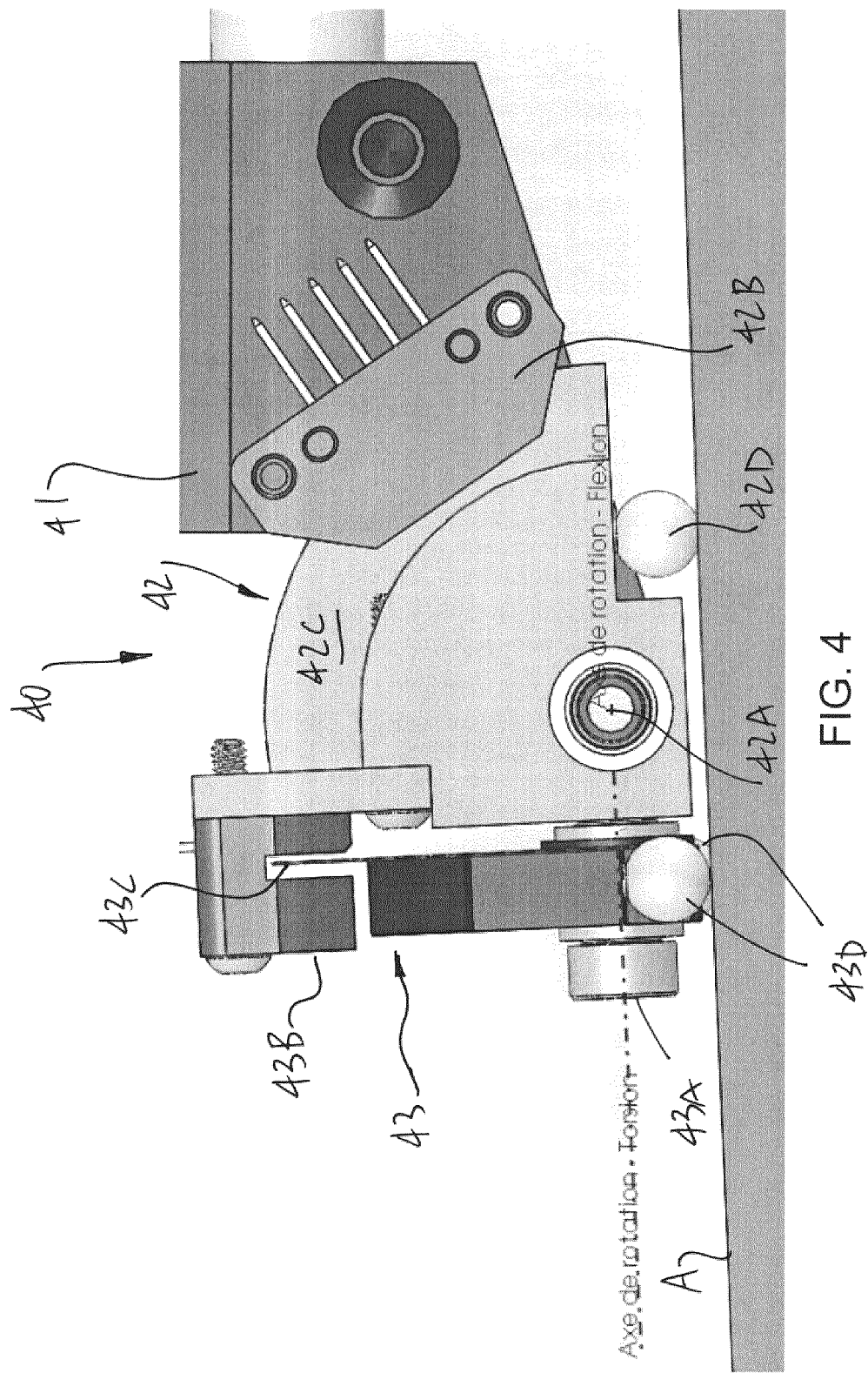
FIG. 4 is a side elevation view of the sensor unit of FIG. 3A.
Figure 5:
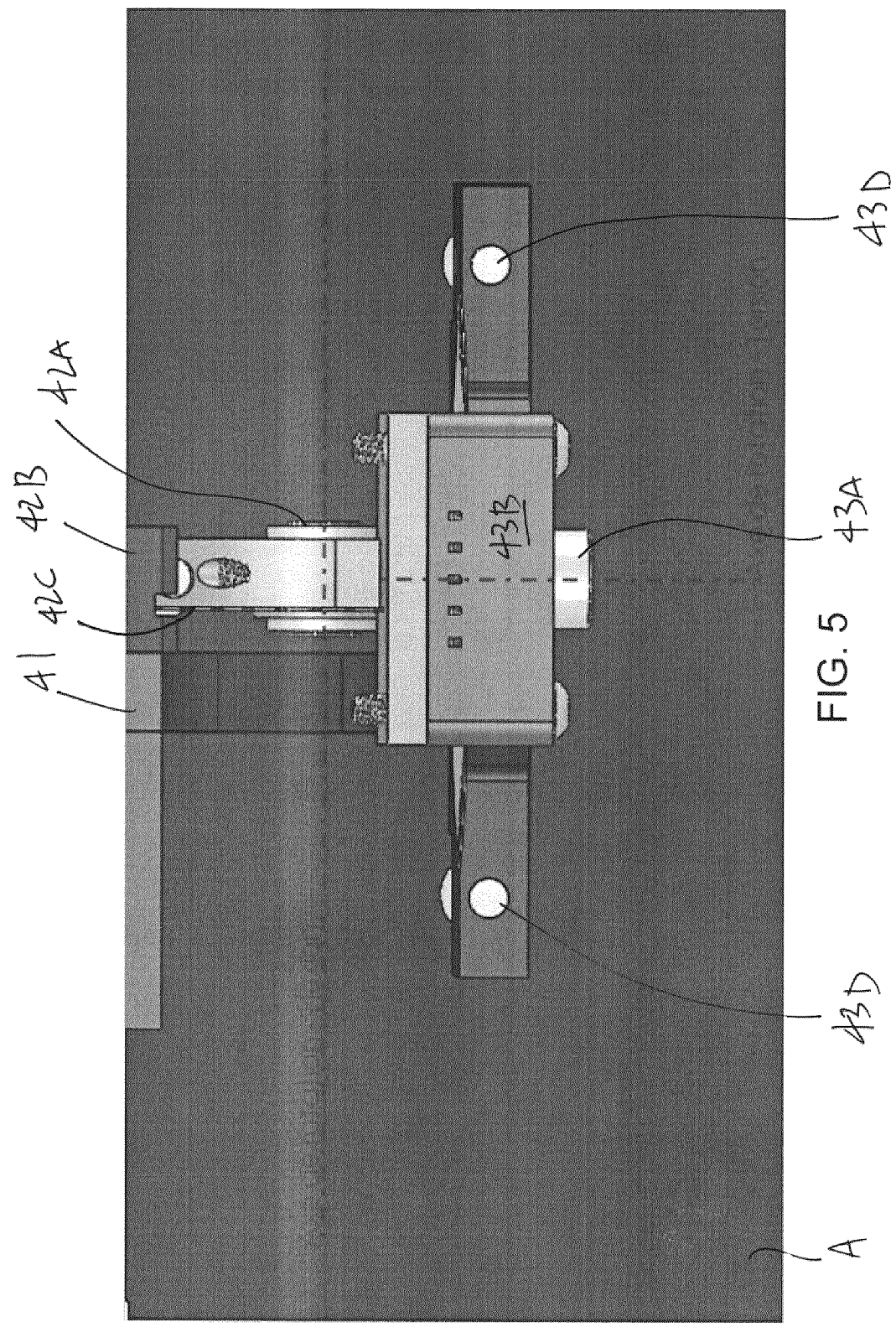
FIG. 5 is a top plan view of the sensor unit of FIG. 3A.

Referring to FIG. 2, locking devices 25 may be used to maintain the jaws 23 in a locked state. The locking devices 25 may be the nut and bolt assemblies shown to allow manual locking, but other alternative devices include quick connect couplings, elastics, etc. Moreover, the clamp 22 may not need to have jaws 23, as it may simply be a support surface upon which the elongated object A lies. For example, in an embodiment featuring two of the clamps 22 supporting a ski A at opposed ends, the apparatus 10 may be without the clamping jaws 23. Likewise, support rollers could be used as an alternative to the clamps 22.

It may be advantageous to select the manner in which the beam will be deformed in flexion in order to increase the precision in the measurements. For example, supporting a ski centrally in the manner shown in FIG. 1 allows a larger moment of flexion at the clamp 22 to be obtained where the rigidity of the ski is at its maximum, while the smaller moment is the extremity of the ski, where the rigidity is at its lowest. This allows to limit the total deformation of the ski to a reasonable amplitude while maximizing the curvature, and the measured signal, at all points. Other clamping schemes are considered as well.

Still referring to FIG. 1, the load-applying module 30 is shown at the front end of the ski A. Again, this arrangement is a particular embodiment, as other arrangements are considered as well. For example, the load-applying module 30 could be positioned at a central location on the ski A in the event that the ski A is supported at opposed ends.

The load-applying module 30 is of the type applying a load with a torsion component and a flexion component. The module 30 therefore has a clamp 31 that has a closable slot 32 to clamp onto the free end of the ski A. The slot 32 can be rotated about the X-axis, whereby the ski A will be twisted when in the slot 32. The position of the clamp 31 may also be adjusted along the Y-axis, to produce a downward flexion force on the ski A. In an embodiment, the clamp 31 is connected to load sensors 33 (e.g., 3-axis sensors, force transducers), such that the load applied on the ski A is readily calculated with the values of the load sensors 33. As an alternative to the load sensors 33, it is contemplated to simply provide known weights to apply the load on the ski A.

Although the load-applying module 30 is described as applying torsional and flexure loads, the load-applying module 30 may readily be arranged to load the ski A in either flexion or torsion only.

Referring to FIGS. 3A-3C, 4 and 5, the sensor unit 40 has a base 41 by which it is connected to the displacement module 50. Accordingly, as detailed hereinafter, the base 41 may be moved in two translational degrees of freedom (DOFs), i.e., along the X and the Y axes. The base 41 serves as a support for the sensing components of the sensor unit 40.

A flexion contact member 42 has a circle-sector body, among other possible shapes. The circle-sector body is rotatably connected to the base 41 by a rotational joint 42A, such that a rotational DOF is provided between the flexion contact member 42 and the base 41. The axis of the rotational DOF may be parallel to the Z axis. In such a case, the axis of the rotational joint 42A lies in or remains constantly parallel to the Y-Z plane. The flexion contact member 42 may have an encoder 42B secured to the base 41. The encoder 42B is in operational relation with a disk portion 42C, so as to measure the angular displacement of the flexion contact member 42 relative to the base 41. A follower 42D (a.k.a., an end) projects beyond a bottom surface of the body so as to be in rolling contact with or sliding along the surface of the ski A. As illustrated, the follower 42D may be a ball (ball roller or ball slider) or ball portion, although other interfaces are considered as well, such as a disk, a slider interface, a pointer, etc. A ball follower 42D minimizes the contact between the follower 42N and the surface of the ski A. Accordingly, the follower 42D may roll or slide along the ski A, when the sensor unit 40 moves in the X direction relative to the ski A.

A torsion contact member 43 has a similar configuration as the flexion contact member 42, but is connected to the flexion contact member 42 instead of being connected to the base 41, although the inverse arrangement is possible as well, or the torsion contact member 43 could also be connected to the base 41. The torsion contact member 43 has a circle-sector body, a rotational joint 43A, an encoder 43B, a disk portion 43C and a pair of followers 43D as contacting end of the torsion contact member 43. The circle-sector body of the torsion contact member 43 is rotatably connected to the flexion contact member 42 by the rotational joint 43A, such that a rotational DOF is provided between the flexion contact member 42 and the torsion contact member 43. In the illustrated embodiment in which the torsion contact member 43 is connected to the flexion contact member 42, due to the rotation of the flexion contact member 42 relative to the base 41, the torsion contact member 43 is displaceable in two rotational DOFs relative to the base 41. Moreover, in an embodiment, the axis of the rotational joint 43A lies in or remains constantly parallel to the X-Y plane. The torsion contact member 43 has its encoder 43B secured to the flexion contact member 42. The encoder 43B is in operational relation with the disk portion 43C, so as to measure the angular displacement of the torsion contact member 43 relative to the flexion contact member 42, and relative to the base 41. The pair of followers 43D project beyond a bottom surface of the body so as to be in rolling, sliding or moving contact with the surface of the ski A. As illustrated, the followers 43D may be ball followers (rollers or sliders), although other probe ends are considered as well, as described above. Accordingly, the followers 43D may roll or slide along the ski A, when the sensor unit 40 moves in the X direction relative to the ski A, but will also act as followers to cause a rotation of the torsion contact member 43 about the rotational joint 43A. This rotation is representative of angular deformations of the ski A along the Z axis, and thus of torsion in the ski A. Moreover, the followers 43D will be paired to the follower 42D to cause a rotation of the flexion contact member 42 about the rotational joint 42A. This rotation is representative of angular deformations of the ski A along the X axis, and thus of flexion in the ski A. The encoders 42B and 43B will therefore detect the angular displacement of the contact members 42 and 43, respectively, to quantify the deformation along axis X and Z, as the sensor unit 40 moves along the ski A. It is contemplated to provide a single contact member, whether it be the contact member 42 or 43, if only one of the torsion and the flexion is required. If only flexion deformation values are required, the sensor unit 40 may have only a first contact member 42 (not a second contact member 43). In such a case, the contact member 42 has an additional follower 42D to compensate for the absence of the followers 43D. Likewise, If only torsion deformation values are required, the sensor unit 40 may have only contact member 43 (not contact member 42).

Optical encoders are one of different types of sensors that may be used as encoders 42B and 43B. It is contemplated to use other orientation sensing technology. For example, inertial sensors (e.g., accelerometers, gyroscopes) or capacitive encoders may be used instead of the optical encoders.

A biasing element 44, such as a constant-force spring, applies an upward pull on the base 41 from the displacement module 50 so as to lessen the pressure it will apply to the ski A. This may ensure that a constant or a low pressure is applied by the sensor unit 40 on the ski A, for the sensor unit 40 pressure to be negligible in causing the torsion or flexion of the ski A. It is also considered to provide a load cell or like load measuring device on the sensor unit 40 to adjust the vertical position of the sensor unit 40 via the displacement module 50 to minimize the pressure applied by the sensor unit 40 on the ski A. The position of the base 41 along the Y-axis may be taken into consideration in quantifying the flexion, and therefore appropriate sensors are used to determine the position of the base 41 in the coordinate system.

The displacement module 50 has a pair of linear actuators. A longer linear actuator 51X is oriented to have its direction parallel to the X-axis, whereas a shorter linear actuator 51Y is mounted to a piston (i.e., a screw or nut) of the longer linear actuator 51X. The linear actuator 51Y is oriented so as to have its direction aligned with the Y-axis. The use of the linear actuator terminology suggests the use of electromechanical actuators, but hydraulic and pneumatic cylinders may be used as well. As another possible, the X displacement may be achieved manually, whereby item 51X may be a slider, whereby the Y displacement could be passive, i.e., may result from the following of the ski A as driven by gravity. Linear potentiometers could be used to measure the displacement these sliders.

A carriage 52 is mounted to the vertical linear actuator 51Y, such that the sensor unit 40 may be moved up and down by the actuation of this vertical linear actuator 51Y. Therefore, the carriage 52 supporting the sensor unit 10 may be displaced along the ski A in the X direction and Y direction, as described above when discussing the displacement of the base 41. As an alternative to linear potentiometers, it is contemplated to provide encoding technology, such as optical encoders, to determine the X position of the sensor unit 40 along the ski A.

Figure 6:
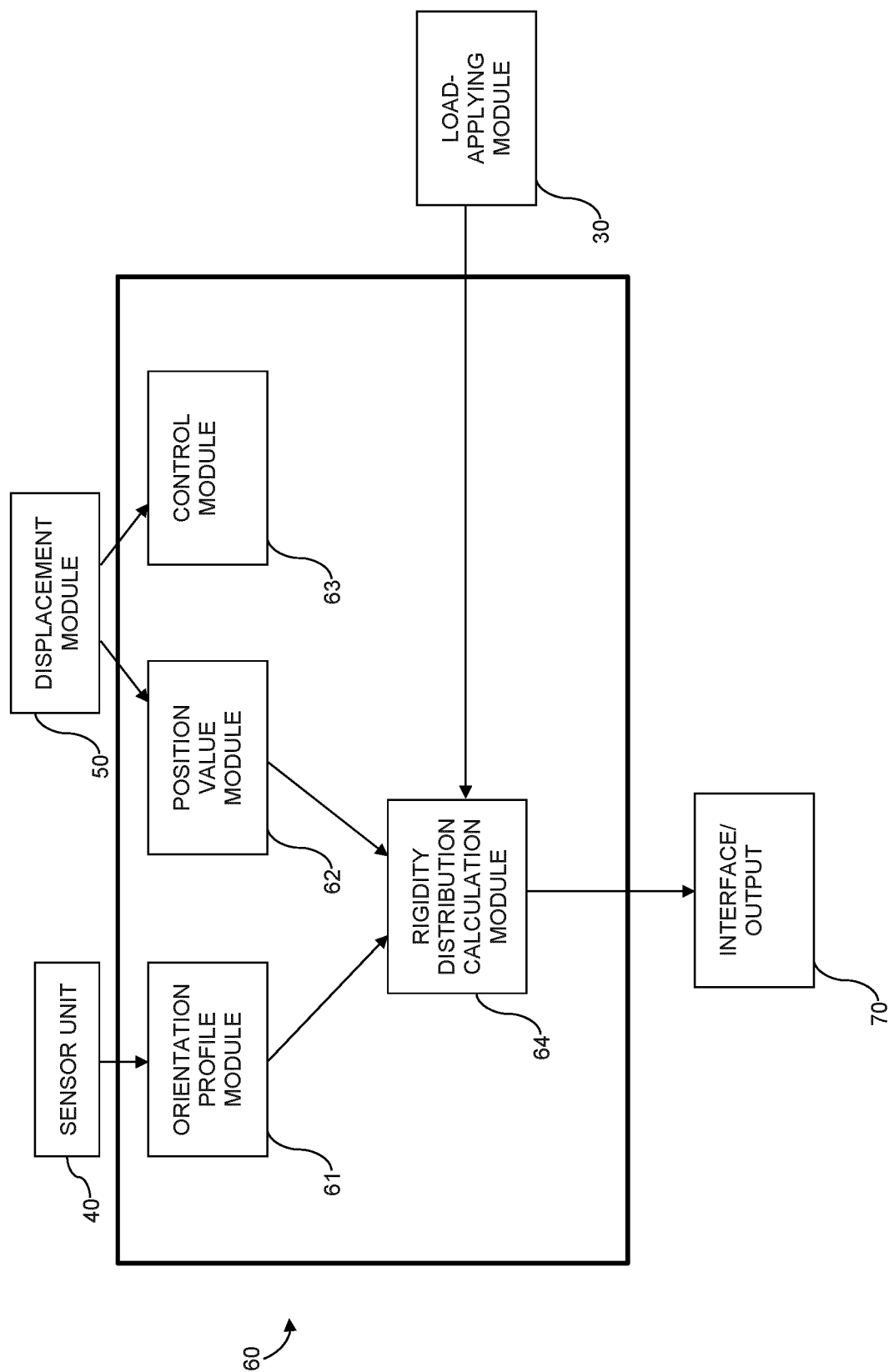
FIG. 6 is a block diagram of a rigidity distribution measurement processor system in accordance with the present disclosure.

Referring to FIGS. 1 and 6, a rigidity distribution measurement processor system 60 is used in conjunction with the apparatus 10 in a system to measure the rigidity of the object, i.e., the ski A. The rigidity distribution measurement processor system 60 is configured to receive signals from the load-applying module 30, from the sensor unit 40 and from the displacement module 50, to calculate the rigidity of the object in the apparatus 10.

The base equation for measuring rigidity in flexion is $$EI = \frac{M}{\rho}$$

in which EI is the rigidity in flexion, M is the moment in flexion and $\rho$ is the radius of curvature. Based on the output of the load-applying module 30 and its position, the moment in flexion M is readily calculated, using common static equilibrium formulas.

The apparatus 10 uses the readings from the sensor unit 40 and the displacement module 50 (e.g., position of the sensor unit 40 in the Y-axis), which concurrently provide an angular deformation profile along the ski A as a function of the distance, to calculate the radius of curvature $\rho$. In particular, the following equation may be used:

$$\rho = \frac{d\theta}{ds}$$

in which dΘ is the angle variation between two positions and ds is the arc between the two positions. The arc may be approximated using dx, based on the values obtained from the deformation profile versus distance data. In contrast, known rigidity measuring techniques require a second derivative of linear deformations which is particularly sensitive to measurement noise.

Another base equation that may be used is that for measuring the rigidity in torsion:

$$GJ = \frac{T}{d\varphi/ds}$$

in which GJ is the rigidity in torsion, T is the torque and φ is the angle of deformation in torsion. In the set-up of FIG. 1, the angle of deformation in torsion is measured using the readings from the optical encoder 43B of the sensor unit 40. The position of the sensor unit 40 along the Y-axis may also be taken into consideration.

Accordingly, the rigidity distribution measurement processor system 60 may operate the apparatus 10 in order to measure the torsional and/or flexure rigidity of the object, by obtaining sensor readings, i.e., for measuring a rigidity distribution of the object such as ski A with the sensor unit 40 relatively movable in a longitudinal dimension of the ski A. As described above, the sensor unit 40 has contact member 42 and/or 43 displaceable one or more rotational degree of freedom as a result of contact with the ski A during relative movement. The system 60 is a computer system having one or more processors executing computer executable instructions, and includes an orientation profile module 61 for generating an orientation profile of the contact member(s) 42 and 43 during the relative movement between the sensor unit 40 and the object in the longitudinal dimension, from readings of the sensor unit 40. For example, the orientation profile may include values for θ and φ as described above. A position value module 62 generates position values for the orientation profile from the relative movement, for example from position sensors on the displacement module 50. The position value module 62 may operate in conjunction with the control module 63 for controlling the actuators of the displacement module 50 displacing the sensor unit 40 along the object in the longitudinal dimension, and up/down. A rigidity distribution calculation module 64 calculates and outputs, via interface 70 for example, a rigidity distribution along the longitudinal dimension of the object, using a moment of force profile applied to the object with the corresponding orientation profile and position values. The rigidity distribution calculation module 64 may calculate the moment of force profile using the force value from the load-applying module 30.

The rigidity distribution measurement processor system 60 may firstly cause the relative movement in the longitudinal dimension of the sensor unit 40 on the ski A—although this may be done manually—, with the sensor unit 40 having the contact members 42 and/or 43 displaceable in their respective rotational degrees of freedom relative to the base 41. An orientation profile is determined during the relative movement from the sensors 42B and/or 43B of the sensor unit 40. X position values are simultaneously calculated and/or measured (i.e., determined) for the orientation profile, for instance by signals from the displacement module 40 (e.g., linear actuator and/or linear potentiometer). Y position values may also be calculated or measured (i.e., determined). For instance, it is contemplated to calculate the Y position values using the orientation values in flexion with the X position values, to obtain the Y position values without using a potentiometer on the Y translation. Using the values from the load-applying module 30, the rigidity distribution may be calculated by the rigidity distribution measurement processor system 60 using the moment of force distributions applied on the object with the corresponding orientation profile and position values.

As an example, the measurement conditions for a ski A are described. The ski A is fixed in the clamp 22 upside-down near the boot area. A combined bending and torsion load is applied near the free end (i.e., tail or tip) through the clamp 31, which may consist of two cylinders. Each end of the clamp 31 is connected through ropes to 3-axis force transducers 33 to measure the load and calculate the bending and torsional moment at all points along the ski. This setup creates a triangular distribution of bending moment that roughly matches the bending stiffness profile of a half-ski (i.e., the moment is greatest near the boot area, where the stiffness is the greatest, and reaches zero at the tip).

To obtain the stiffness distributions on the full length of the ski A, the ski A is divided in two overlapping sections, front and back, which are measured in separate steps. Measuring the rigidity of only half the ski at a time in a clamped/free configuration facilitates the application of a combined bending and torsional load to the ski while still keeping the ideal triangular distribution of the bending moment. If the whole length of the ski A were tested at once, a 3-point flexural test would be necessary to obtain the same triangular bending moment distribution, thereby complicating the simultaneous application of a torsional load.

For each half, the deformation is calculated by subtracting the measured unloaded shape (i.e., camber) from the deformed state under the applied load. Both test results are combined using a reference marker placed in the overlapping region, while the measurements in this region are averaged together.

While the methods and systems described herein have been described and shown with reference to particular steps performed in a particular order, it will be understood that these steps may be combined, subdivided or reordered to form an equivalent method without departing from the teachings of the present invention. Accordingly, the order and grouping of the steps is not a limitation of the present invention.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The invention claimed is:

1. An apparatus for measuring a deformation distribution of an object having a longitudinal dimension, comprising:
   a structure for supporting the object;
   a sensor unit comprising a base, at least one contact member having a body connected to the base by a rotational joint such that at least one rotational degree of freedom is provided between the base and the contact member, at least an end of the body configured to contact and move along the object, and at least one sensor for determining an orientation of the body relative to the base;

a displacement module enabling relative movement between the sensor unit and the structure for the sensor unit to relatively move along the object in the longitudinal dimension; and a processor for receiving readings from at least the sensor unit, and for measuring a deformation distribution of the object using at least the orientation of the body relative to the base as a function of a position of the body in the longitudinal dimension.

2. The apparatus according to claim 1, wherein the at least one contact member includes a flexion contact member rotatably connected relative to the base such that an axis of rotation of the flexion contact member is generally perpendicular to a vector of the longitudinal dimension.

3. The apparatus according to claim 2, wherein the at least one contact member includes a torsion contact member rotatably connected relative to the base such that an axis of rotation of the torsion contact member lies in a same plane as a vector of the longitudinal dimension.

4. The apparatus according to claim 3, wherein the flexion contact member is rotatably connected to the base, and the torsion contact member is rotatably connected to the flexion contact member.

5. The apparatus according to claim 3, wherein the torsion contact member has two of the ends configured to contact and move along the object, the two ends being on opposed sides of the axis of rotation of the flexion contact member.

6. The apparatus according to claim 1, wherein the at least one end is a follower ball portion.

7. The apparatus according to claim 1, wherein the at least one sensor is an optical encoder for each one of the rotational degree of freedom.

8. The apparatus according to claim 1, wherein the structure has a clamp to releasably support the object.

9. The apparatus according to claim 1, further comprising a load-applying module for applying a load on the object.

10. The apparatus according to claim 9, wherein the load-applying module has a clamp configured for being connected to the object, the clamp adapted to receive forces at opposed end to exert flexion and/or torsion on the object.

11. A rigidity distribution measurement processor system for measuring a rigidity distribution of an object having a longitudinal dimension with a sensor unit relatively movable in a longitudinal dimension along the object, the sensor unit having at least one contact member displaceable in at least one rotational degree of freedom as a result of contact with the object during relative movement, comprising:

an orientation profile module for generating an orientation profile of the at least one contact member during the relative movement between the sensor unit and the object in the longitudinal dimension, from readings of the sensor unit;

a position value module for generating position values for the orientation profile from the relative movement; and a rigidity distribution calculation module for calculating and outputting a rigidity distribution along the longitudinal dimension of the object, using a moment of force profile applied to the object with the corresponding orientation profile and position values.

12. The rigidity distribution measurement processor system according to claim 11, further comprising a control module for controlling at least one actuator displacing the sensor unit along the object in the longitudinal dimension.

13. The rigidity distribution measurement processor system according to claim 12, wherein the control module controls movement of the sensor unit in a vertical direction.

14. The rigidity distribution measurement processor system according to claim 11, wherein the orientation profile module generates the orientation profile to include movements of the at least one contact member about an axis generally perpendicular to a vector of the longitudinal dimension, and wherein the rigidity distribution calculation module calculates and outputs the flexion of the object.

15. The rigidity distribution measurement processor system according to claim 11, wherein the orientation profile module generates the orientation profile to include movements of the at least one contact member about an axis lying in a same plane as a vector of the longitudinal dimension, and wherein the rigidity distribution calculation module calculates and outputs the torsion of the object.

16. The rigidity distribution measurement processor system according to claim 11, wherein the rigidity distribution calculation module obtains a value of force applied to the object, and calculates the moment of force profile from the value of force applied to the object.

17. An apparatus for measuring a deformation distribution of an object having a longitudinal dimension, comprising:

a structure for supporting the object, the structure having a clamp to releasably support the object;

a sensor unit comprising a base, at least one contact member having a body connected to the base by a rotational joint such that at least one rotational degree of freedom is provided between the base and the contact member, at least an end of the body configured to contact and move along the object, and at least one sensor for determining an orientation of the body relative to the base; and a displacement module enabling relative movement between the sensor unit and the structure for the sensor unit to relatively move along the object in the longitudinal dimension.

18. The apparatus according to claim 17, further comprising a load-applying module for applying a load on the object.

19. The apparatus according to claim 18, wherein the load-applying module has a clamp configured for being connected to the object, the clamp adapted to receive forces at opposed end to exert flexion and/or torsion on the object.

20. The apparatus according to claim 17, further comprising a processor for receiving readings from at least the sensor unit, and for measuring a deformation distribution of the object using at least the orientation of the body relative to the base as a function of a position of the body in the longitudinal dimension.

\* \* \* \* \*